(12) United States Patent
Park et al.

(10) Patent No.: US 7,042,167 B2
(45) Date of Patent: May 9, 2006

(54) BACK LIGHT DEVICE FOR LIQUID CRYSTAL DISPLAYS

(75) Inventors: Deuk Il Park, Suwon-si (KR); Choong Yop Rhew, Suwon-si (JP)

(73) Assignee: LS Tech Co., Ltd., (KR)

( * ) Notice: Subject to any disclaimer, the term of this patent is extended or adjusted under 35 U.S.C. 154(b) by 6 days.

(21) Appl. No.: 10/813,185

(22) Filed: Mar. 29, 2004

(65) Prior Publication Data

US 2005/0134183 A1    Jun. 23, 2005

(30) Foreign Application Priority Data

Dec. 18, 2003    (KR) ..................... 10-2003-0092852

(51) Int. Cl.
*H05B 37/00*    (2006.01)

(52) U.S. Cl. .............. 315/229; 315/227 R; 315/209 R; 315/291; 345/102; 349/64; 349/67; 362/608; 362/614; 362/225

(58) Field of Classification Search ........... 315/241 R, 315/227 R, 246, 232, 209 R, 244, 229, 291; 345/87, 102, 905; 349/64, 67, 70, 112, 113; 362/608, 609, 614, 225, 245, 246, 260, 249, 362/560, 561
See application file for complete search history.

(56) References Cited

U.S. PATENT DOCUMENTS

| 5,420,481 A | * | 5/1995 | McCanney | 315/291 |
| 5,914,560 A | * | 6/1999 | Winsor | 313/493 |
| 6,177,768 B1 | * | 1/2001 | Kamata et al. | 315/241 R |
| 6,295,110 B1 | * | 9/2001 | Ohe et al. | 349/124 |
| 6,586,863 B1 | * | 7/2003 | Kim et al. | 310/359 |
| 6,796,678 B1 | * | 9/2004 | Moon | 362/225 |
| 6,843,584 B1 | * | 1/2005 | Bang et al. | 362/249 |
| 2005/0127848 A1 | * | 6/2005 | Park et al. | 315/209 R |

FOREIGN PATENT DOCUMENTS

| JP | 1996-0150031 | 6/1996 |
| JP | 1999-0290426 | 10/1999 |
| JP | 2000-0082441 | 3/2000 |
| KR | 1020030050831 | 6/2003 |

* cited by examiner

*Primary Examiner*—Haissa Philogene
(74) *Attorney, Agent, or Firm*—Schmeiser Olsen & Watts, LLP

(57) ABSTRACT

Disclosed herein is a back light device for LCDs. The back light device includes an inverter to supply an alternating current or a pulse, a plurality of fluorescent lamps to radiate visible light, a reflection member to reflect the light radiated from the fluorescent lamps, a diffusion member to diffuse the light, and a frame to house the above elements therein. An external electrode is provided at a first end of each of the fluorescent lamps, and an internal electrode is provided at a second end of each of the fluorescent lamps. An extension electrode is provided on an outer surface of the second end of each of the fluorescent lamps to be connected to an associated internal electrode. A holding terminal is provided at each of both ends of each fluorescent lamp to connect the external and extension electrodes to each other. Further, an inverter is provided to operate the fluorescent lamps.

2 Claims, 6 Drawing Sheets

BACK LIGHT DEVICE FOR LIQUID CRYSTAL DISPLAYS

BACKGROUND OF THE INVENTION

1. Field of the Invention

The present invention relates generally to direct-type back light devices for liquid crystal displays, and more particularly, to a direct-type back light device for a liquid crystal display, which is easy to assemble and is constructed so that a plurality of fluorescent lamps are controlled by a single inverter, thus reducing power consumption.

2. Description of the Related Art

Recently, there is a growing tendency to increase the size of a liquid crystal display (LCD). As the size of the LCD is increased, a back light device having a large size and high luminance is required. Such a back light device, having the large size and high luminance, must be provided with a plurality of cold cathode fluorescent lamps and a plurality of inverters.

As shown in FIG. 1, a conventional back light device for the LCD includes a diffusion member 20 and a reflection member 40. A plurality of fluorescent lamps 30 are installed between the diffusion member 20 and the reflection member 40 to be arranged side by side. Further, light radiated from the fluorescent lamps 30 is reflected by the reflection member 40, and is irradiated to a panel (not shown) of the LCD through the diffusion member 20.

Further, as shown in FIG. 2, the conventional direct-type back light device for the LCD includes a plurality of inverters 50. A capacitor 51 is connected to an output terminal of each of the inverters 50, and each of the fluorescent lamps 30 is connected to the output terminal of an associated inverter 50. Further, a high voltage transformer 52 and the corresponding capacitor 51 are connected to the output terminal of each of the inverters 50.

However, as shown in FIG. 2, the conventional back light device for the LCD is constructed so that the number of inverters 50 is increased, as the number of the fluorescent lamps 30 is increased. Thus, the conventional back light device is problematic as follows.

The conventional back light device has a problem in that luminance thereof is not uniform, because there may exist characteristic differences between a plurality of inverters 50 or between a plurality of the capacitors 51 provided at the output terminals of the corresponding inverters 50. Further, the output voltages and frequencies of the transformers 52 provided at the output terminals of the corresponding inverters 50 are dispersed, thus leading to non-uniformity of luminance. In order to reduce the dispersion of the output voltages and frequencies, the back light device may additionally have a dimming circuit to control an optical output.

The conventional back light device has another problem in that operational reliability thereof may be deteriorated, due to the use of the plurality of inverters 50.

The conventional back light device has a further problem in that manufacturing costs thereof are increased, due to the use of the plurality of inverters 50.

The conventional back light device has still another problem in that the back light device includes the plurality of inverters 50, thus reducing operational efficiency of the back light device, and thereby increasing power consumption.

Further, the conventional back light device has still another problem in that assembly thereof is deteriorated, due to the use of the plurality of inverters 50 and electric wires.

SUMMARY OF THE INVENTION

Accordingly, the present invention has been made keeping in mind the above problems occurring in the prior art, and an object of the present invention is to provide a direct-type back light device for LCDs, which does not use a plurality of inverters, different from the conventional direct-type back light device, thus reducing costs of the product and manufacturing costs, and enhancing operational reliability, and reducing power consumption.

In order to accomplish the above object, the present invention provides a back light device for LCDs, including a fluorescent lamp, an inverter to supply an alternating current or a pulse to the fluorescent lamp, a reflection member to reflect light radiated from the fluorescent lamp, a diffusion member to diffuse the light, and a frame to house the fluorescent lamp, the inverter, the reflection member and the diffusion member therein, an external electrode provided at a first end of the fluorescent lamp, an internal electrode provided at a second end of the fluorescent lamp, and an extension electrode connected to the internal electrode. Further, a holding terminal is provided at a predetermined position in the frame to hold each of the first and second ends of the fluorescent lamp, and connect the external electrode to the extension electrode.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
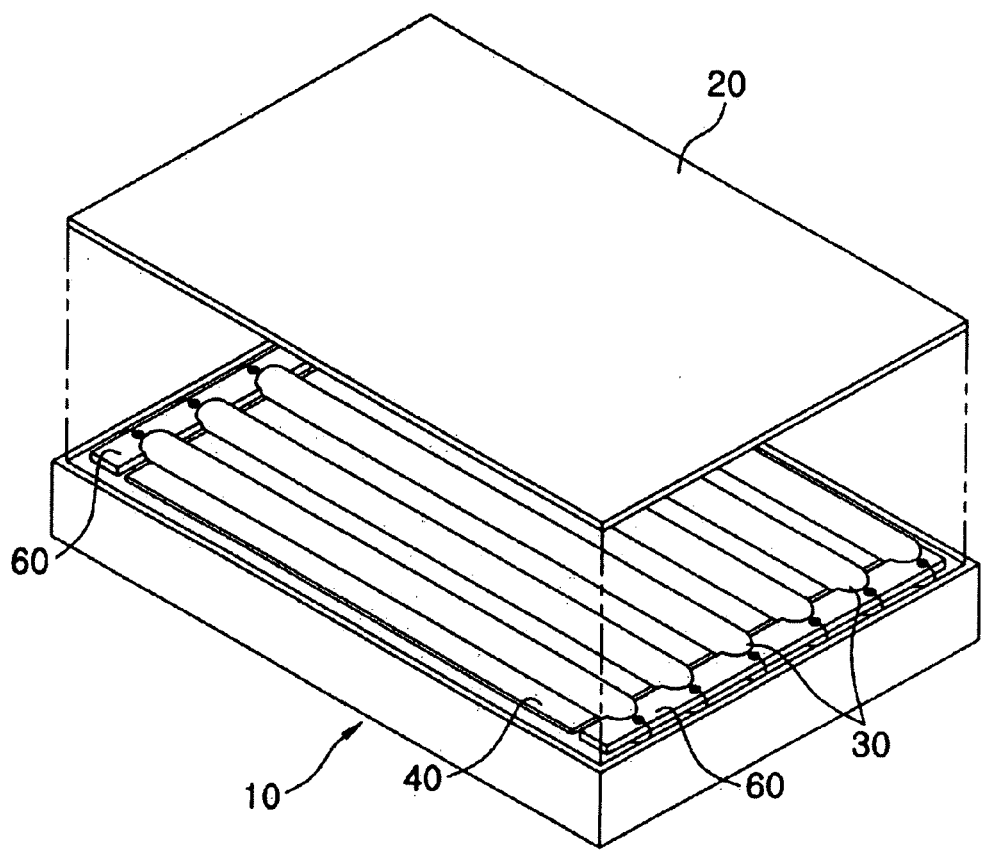
FIG. 1 is an exploded perspective view of a conventional direct-type back light device for LCDS.

Hereinafter, embodiments of the present invention will be described in detail with reference to the attached drawings. Reference now should be made to the drawings, in which the same reference numerals are used throughout the different drawings to designate the same or similar components.

A back light device for LCDs according to the present invention is constructed to efficiently control a plurality of fluorescent lamps 30 using one or two inverters 50. The back light device includes a frame 10. The fluorescent lamps 30, a reflection member 40, and a diffusion member 20 are installed in the frame 10. The fluorescent lamps 30 radiate light by the inverters 50. The reflection member 40 reflects the light radiated from the fluorescent lamps 30. The diffusion member 20 diffuses the light radiated from the fluorescent lamps 30.

In order to solve the problems of the conventional back light device, the back light device of this invention is constructed as follows. That is, an external electrode 60 is provided on a first end of each of the fluorescent lamps 30 to limit a current of the fluorescent lamp 30. An internal electrode 70 is provided in a second end of each of the fluorescent lamps 30. Further, an extension electrode 80 is provided on an outer surface of the second end of each fluorescent lamp 30 at a position corresponding to the internal electrode 70. Further, the back light device includes holding terminals 90 to hold the fluorescent lamps 30, and easily connect the external and extension electrodes 60 and 80 of the fluorescent lamps 30 to each other. Such a construction enhances the assembly of the back light device, and allows the plurality of fluorescent lamps 30 to be simultaneously controlled using a single inverter 50.

Therefore, according to the present invention, the problems of the conventional direct-type back light device using a plurality of inverters are efficiently solved. That is, the back light device of the present invention reduces costs of the product and enhances assembly.

Figure 3:
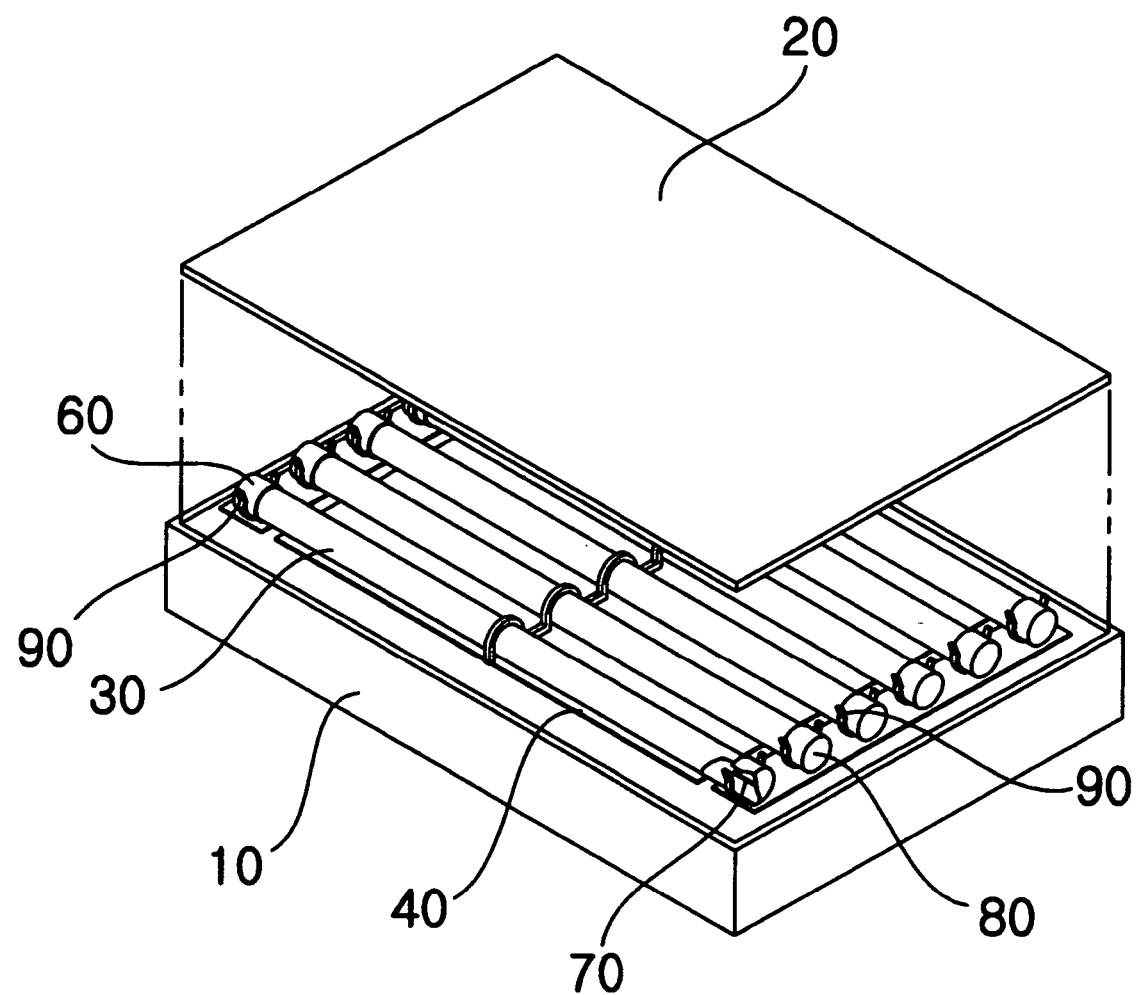
FIG. 3 is a perspective view of a back light device, according to an embodiment of the present invention.
Figure 4:
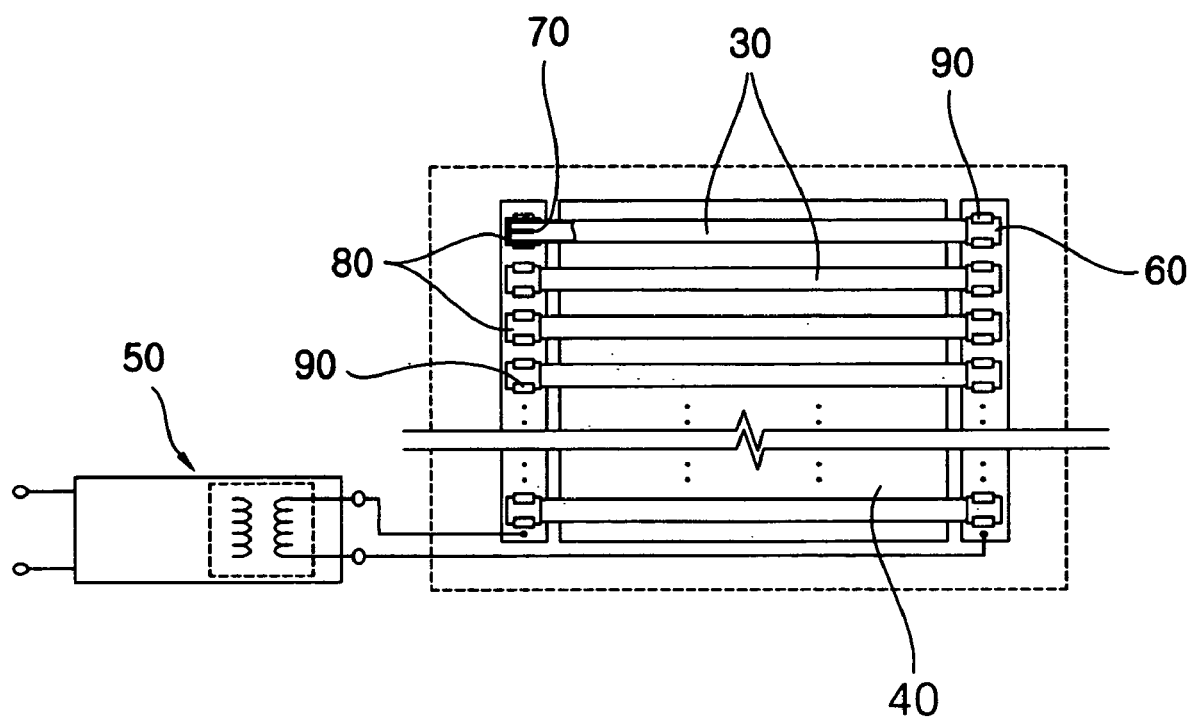
FIG. 4 is a view to show an arrangement of lamps and an inverter included in the back light device of FIG. 3.

As shown in FIGS. 3 and 4, the back light device of this invention includes the frame 10 and the plurality of fluorescent lamps 30. The external electrode 60 is provided on the first end of each fluorescent lamp 30, while the internal electrode 70 is provided in the second end of each fluorescent lamp 30. The extension electrode 80 is connected to an associated internal electrode 70. The back light device also includes the holding terminals 90 to hold the fluorescent lamps 30 and connect the external and extension electrodes 60 and 80 of the fluorescent lamps 30 to each other. The inverter 50 functions to operate the fluorescent lamps 30. The reflection member 40 is placed under the fluorescent lamps 30, and the diffusion member 20 is placed above the fluorescent lamps 30.

In a detailed description, as shown in FIG. 4, the external electrode 60 is provided on the first end of each fluorescent lamp 30 to limit the current, and the internal electrode 70 is provided in the second end of each fluorescent lamp 30. Further, the extension electrode 80 is provided on the outer surface of the second end of each fluorescent lamp 30 at a position corresponding to the internal electrode 70. In this case, the extension electrode 80 is connected to an associated internal electrode 70. Further, the holding terminals 90 are provided at the first and second ends of each fluorescent lamp 30 to hold the external electrode 60 and the extension electrode 80, respectively. That is, the holding terminals 90 function to supply the current to the fluorescent lamps 30, in addition to functioning to hold the fluorescent lamps 30 at desired positions.

Further, the inverter 50 is connected to a position around the holding terminals 90 which hold the external electrodes 60 and the extension electrodes 80 of the fluorescent lamps 30, thus controlling the supply of power to the fluorescent lamps 30. As such, the plurality of fluorescent lamps 30 are controlled by the single inverter 50, thus reducing costs of the product, and having a simple construction, and thereby allowing the fluorescent lamps 30 to be easily assembled.

Figure 2:
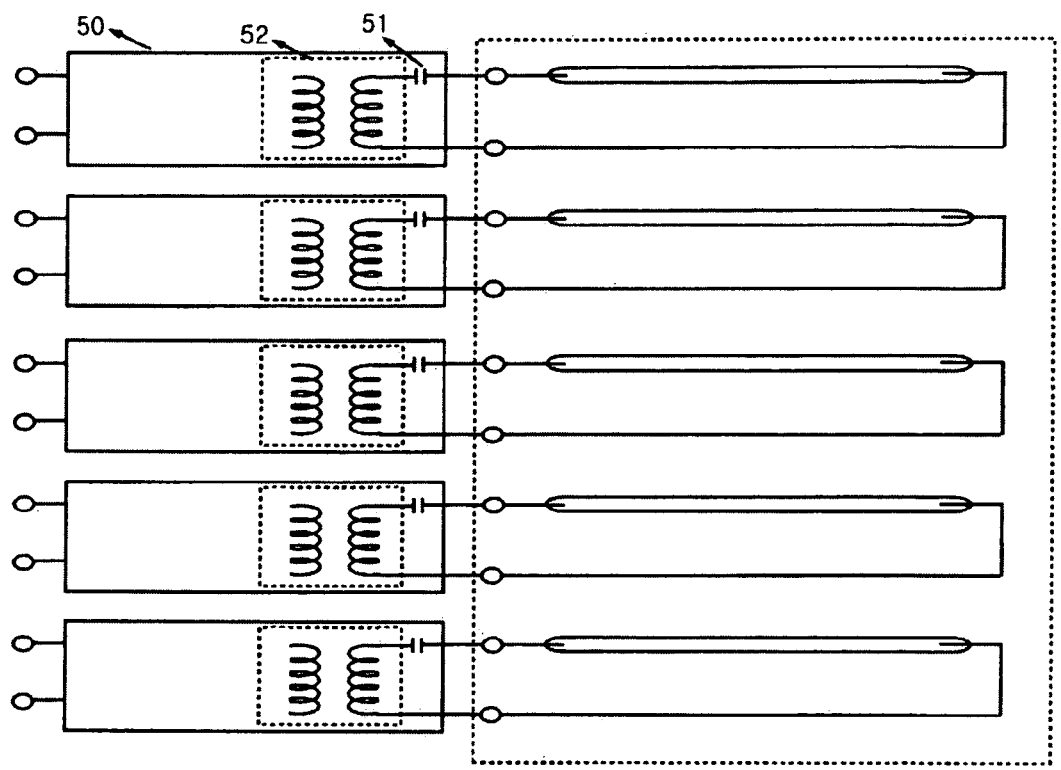
FIG. 2 is a view to show an arrangement of lamps and inverters included in the conventional direct-type back light device of FIG. 1.

Each of the external electrodes 60 functions as the capacitor 51 (see, FIG. 2), to limit the current of an associated fluorescent lamp 30. In this case, it is possible to change the length of each external electrode 60, according to several factors, including the current and luminance of the fluorescent lamps 30, and the frequency and voltage of the inverter 50. According to the present invention, it is preferable that each external electrode 60 have the length of 10~30 mm. When the length of each external electrode 60 is 10 mm or less, the luminance and radiance efficiency of the fluorescent lamps 30 are low, and moreover, it takes a longer time to reach the maximum luminance. Meanwhile, when the length of each external electrode 60 is 30 mm or more, the luminance of the fluorescent lamps 30 is rapidly increased within a short period. However, a part around each of the external electrodes 60 is heated. Further, the deterioration of the fluorescent lamps 30 easily occur, thus shortening lifespans of the fluorescent lamps 30. Particularly, when each external electrode 60 is excessively long, a non-radiating area of the back light device is increased, thus a width of an edge of the LCD is undesirably increased.

Each of the extension electrodes 80 is connected to the associated internal electrode 70 provided in the second end of each fluorescent lamp 30. The extension electrodes 80 allow the fluorescent lamps 30 to be easily assembled with the corresponding holding terminals 90, when manufacturing the back light device. Of course, it is possible to arrange the fluorescent lamps 30 in parallel with each other by only the internal electrodes 70 without using the extension electrodes 80. However, when only the internal electrodes 70 are used without the extension electrodes 80, electrodes provided at both ends of each fluorescent lamp 30 have different shapes. Thus, the both ends of each fluorescent lamp 30 are installed in the frame 10 through different methods, thus leading to a complicated structure, and thereby it is inconvenient to assemble. Therefore, it is preferable that the both ends of each fluorescent lamp 30 have electrodes of the same shape. Due to the above-mentioned reasons, the back light device of this invention includes the extension electrodes 80.

As shown in FIG. 4, the external electrodes 60 and the extension electrodes 80 of the fluorescent lamps 30 are connected in parallel with each other, and are simultaneously controlled by the single inverter 50. According to the present invention, the number of the fluorescent lamps 30 is twenty, and the fluorescent lamps 30 are installed in the frame 10 using the holding terminals 90 provided at both ends of each fluorescent lamp 30. Each of the holding terminals 90 comprises a clip, a metal socket, a connector, and others, which are easy to assemble. According to this invention, the holding terminals 90 comprising the metal socket are connected to each other, and some of the holding terminals 90 are connected to the output terminal of the inverter 50. In this case, the maximum input voltage, maximum output voltage, and drive frequency of the inverter 50 are 15V, 1.5 kV, and 60 kHz, respectively.

In the back light device of this invention, the fluorescent lamps 30 are connected in parallel with each other and simultaneously controlled by the single inverter 50. Further, when one desires to reduce a thickness of the inverter 50 to accomplish thinness, the fluorescent lamps 30 and the holding terminals 90 may be divided into two groups to be respectively controlled by two inverters 50.

Figure 5:
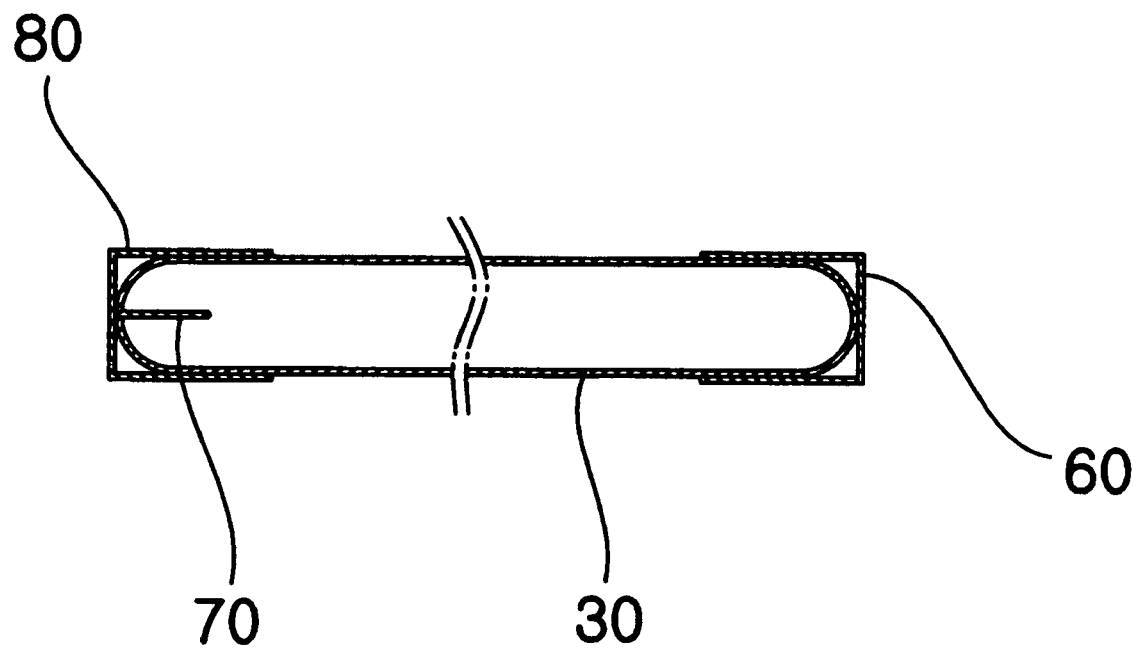
FIG. 5 is a view to show a shape of each of the lamps included in the back light device of FIG. 3.

FIG. 5 is a view to show a shape of each fluorescent lamp included in the back light device of FIG. 3. Each fluorescent lamp 30 has the length of 535 mm and the outer diameter of 2.4 mm. Each fluorescent lamp 30 includes at the first end thereof the external electrode 60 which has the length of 15 mm and is fabricated in the form of a metal cap. Further, each fluorescent lamp 30 includes, in the second end thereof, the internal electrode 70 having the length of 5 mm. Further, the extension electrode 80, which has the length of 15 mm and is fabricated in the form of a metal cap, covers the outer surface of the second end of each fluorescent lamp 30 at a position corresponding to each internal electrode 70. In this case, the extension electrode 80 is connected to the associated internal electrode 70 by soldering a lead of the internal electrode 70.

Preferably, each extension electrode 80 fabricated in the form of the metal cap is in close contact with the outer surface of an associated fluorescent lamp 30. When the extension electrode 80 is not in close contact with the outer surface of the associated fluorescent lamp 30, an electric discharge may occur through a gap defined between the extension electrode 80 and the outer surface of the associated fluorescent lamp 30, so that a leakage current may be generated, and moreover, the soldered or welded part may be removed when the fluorescent lamp 30 is mounted to the associated holding terminal 90. According to this invention, each of the external electrode 60 and the extension electrode 80 comprises the metal cap which is slightly smaller than the outer diameter of each fluorescent lamp 30 and has a slit at a predetermined portion of the metal cap, so that the external electrode 60 and the extension electrode 80 are in close contact with the both ends of each fluorescent lamp 30. The external electrode 60 and the extension electrode 80 may be fabricated by using an adhesive metal tape or by coating or burning paste containing a metal element. Or, the external electrode 60 and the extension electrode 80 may be fabricated using both the paste containing the metal element and the metal cap. Further, an insulation material may be provided between the outer surface of each fluorescent lamp 30 and the metal cap so that the external electrode 60 and the extension electrode 80 are in close contact with each fluorescent lamp 30. In this case, the insulation material must be as thin as possible and have high resistance to heat generated from each fluorescent lamp 30. The materials of the external electrode 60 and the extension electrode 80 do not matter, if only the external electrode 60 and the extension electrode 80 are in close contact with the outer surface of each fluorescent lamp 30 and smoothly execute original functions thereof.

Figure 6:
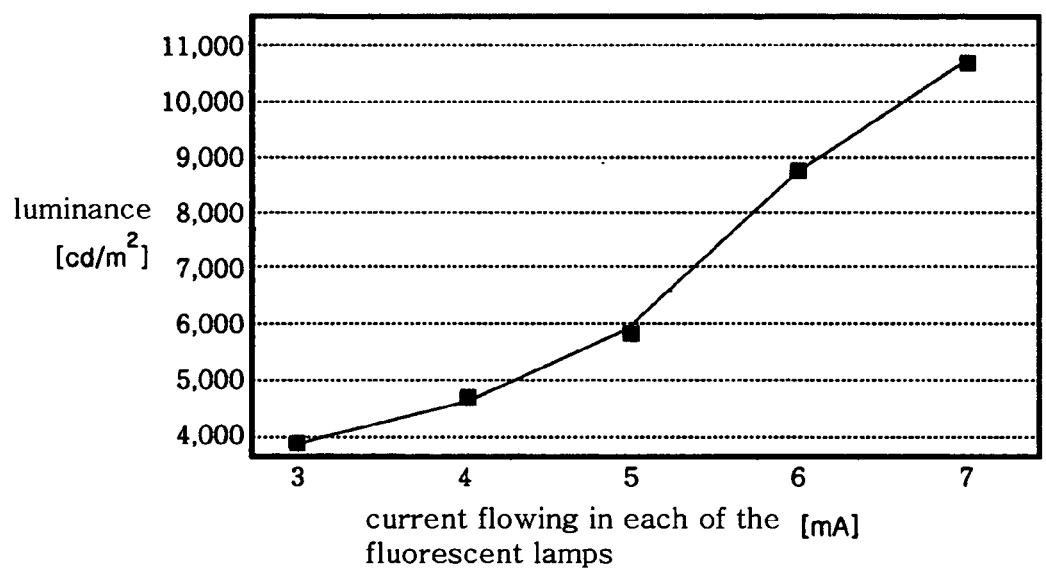
FIG. 6 is a graph to show luminance of the back light device as a function of a current flowing in each of the lamps of the back light device of FIG. 3.

FIG. 6 is a graph to show luminance of the back light device as a function of a current flowing in each of the fluorescent lamps of the back light device of FIG. 3. As shown in the graph, high luminance can be accomplished relative to the current, although twenty fluorescent lamps 30 are controlled by the single inverter 50. The graph is obtained under the condition that the current flowing in each fluorescent lamp 30 is controlled by the input voltage of the inverter 50, the current value of each fluorescent lamp 30 is measured by an ammeter (Model 016, YOKOGAWA), and the luminance of the back light device is measured by a machine of BM-7 (TOPCON). As described above, the back light device of this invention is easy to assemble, and allows the plurality of fluorescent lamps 50 to be simultaneously operated by the single inverter 50, thus overcoming the drawbacks of the conventional back light device, therefore enhancing assembly and reducing manufacturing costs thereof.

As described above, the present invention provides a back light device for LCDs, which includes an external electrode provided at a first end of each of fluorescent lamps to limit the current of the fluorescent lamp, an internal electrode provided in a second end of each of fluorescent lamps, an extension electrode connected to the internal electrode, and a holding terminal to hold each of the fluorescent lamps and connect the external and extension electrodes of the fluorescent lamp to each other, thus being easy to assemble and allowing a plurality of fluorescent lamps to be simultaneously controlled by a single inverter. Therefore, the present invention reduces costs of the back light device and manufacturing costs thereof, and enhances operational reliability thereof, and reduces power consumption thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A back light device for liquid crystal displays, comprising:
   a fluorescent lamp;
   an inverter to supply an alternating current or a pulse to the fluorescent lamp;
   a reflection member to reflect light radiated from the fluorescent lamp;
   a diffusion member to diffuse the light;
   a frame to house the fluorescent lamp, the inverter, the reflection member and the diffusion member therein;
   an external electrode provided at a first end of the fluorescent lamp;
   an internal electrode provided at a second end of the fluorescent lamp; and
   an extension electrode connected to the internal electrode, so that a plurality of fluorescent lamps are operated by the single inverter.

2. The back light device according to claim 1, further comprising:
   a holding terminal provided at a predetermined position in the frame to hold each of the first and second ends of the fluorescent lamp, and connect the external electrode to the extension electrode.

* * * * *